fn
2,794,795

LINEAR POLYESTERS FROM 4,4'-DICAR-BALKOXYBENZANILIDES

Delbert D. Reynolds and Thomas M. Laakso, Rochester, N. Y., assignors to Eastman Kodak Company, Rochester, N. Y., a corporation of New Jersey No Drawing. Application November 2, 1953,
Serial No. 389,891

18 Claims. (Cl. 260—75)

This invention relates to highly polymeric linear polyesters prepared by condensing esters of 4,4'-dicarboxybenzanilide with a polymethylene glycol.

This invention also relates to interpolyesters prepared by employing a mixture of a 4,4'-dicarbalkoxybenzanilide and another aliphatic or aromatic acid ester with a glycol or mixture of glycols.

It is an object of this invention to provide novel polyesters and interpolyesters as described herein. It is another object of this invention to provide a novel process as described herein for preparing valuable polyesters and interpolyesters. An additional object is to provide as a new compound 4,4'-dicarboxybenzanilide. Still another object is to provide alkyl and aryl esters of 4,4'-dicarboxybenzanilide. Other objects will become apparent hereinafter.

Highly polymeric esters of terephthalic acid and various glycols, for example, ethylene glycol, tetramethylene glycol, etc., are well known and have been used in the preparation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described.

We have now discovered a new compound and various esters thereof which can be employed in the preparation of valuable linear polyesters (including interpolyesters) having certain unique properties. These new compounds include the various aliphatic and aromatic esters and half esters as well as the free acid form of 4,4'-dicarboxybenzanilide which can be represented by the following formula:

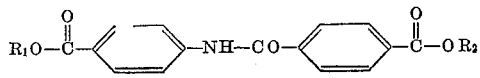

wherein $R_1$ and $R_2$ each represents an alkyl radical containing from 1 to 10 carbon atoms or an aryl radical of the benzene series containing from 6 to 9 carbon atoms.

Most advantageously, the lower alkyl esters of 4,4'-dicarboxybenzanilide wherein the alkyl radicals contain from 1 to 6 carbon atoms are employed in the preparation of the linear highly polymeric polyesters of this invention. The acid chloride instead of the esters can also be employed. Examples of esters which can be advantageously employed in the preparation of polyesters are 4,4'-dicarbethoxybenzanilide, 4,4'-dicarbutoxybenzanilide, 4,4'-dicarbhexoxybenzanilide and other esters derived from methyl alcohol, isopropyl alcohol, secondary amyl alcohol, etc. It is advantageous to employ an alcohol having a boiling point well below that temperature at which the condensation to form the polyester is carried out.

The new linear polyesters (including the interpolyesters) of this invention can be prepared having a softening point well above 200° C. and fibers, films, etc. of exceptional properties at high temperatures can be prepared from these new polyesters. These fibers, films, etc., have exceptionally high tensile strength and elasticity. Fibers can be prepared so as to have softening points sufficiently above 200° C. to withstand normal ironing and pressing of fabrics made from these fibers which also show excellent resistance to most organic solvents, even at elevated temperatures. These novel polyesters can be extruded in the form of films or sheets which can be mechanically and heat treated so as to develop valuable properties as photographic film base material because of their excellent dimensional stability and resistance to swelling by water.

These novel polyesters may contain as substituents thereof small percentages of the 4,3'- and/or the 3,3'-isomers of the 4,4'-dicarboxybenzanilide without substantial deleterious effect on the properties of the polyesters, especially when the highest possible melting or softening points are not necessarily desired.

These new polyesters can be processed to form fibers or films by melt spinning methods and can be extruded or drawn in the molten state to yield products which can subsequently be cold drawn to the extent of several hundred percent of their original lengths (or widths) whereby molecularly oriented structures of great strength and pliability can be obtained. As described in the examples set forth hereinbelow, the condensation product of the process as set forth in the various examples constitutes a highly viscous melt which is capable of being drawn into fibers or extruded into the form of film. Alternatively, the condensation product can be cooled and comminuted followed by subsequent remelting and processing to form fibers, photographic film, molded articles or other shaped products.

POLYESTERS FROM DICARBOXYBENZANILIDES

One embodiment of our invention relates to a process for preparing a novel polyester which comprises (A) condensing a benzanilide compound having the formula:

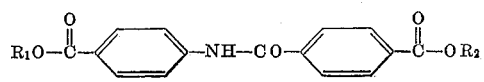

wherein $R_1$ and $R_2$ each represents a substituent selected from the group consisting of an alkyl radical containing from 1 to 6 carbon atoms, (B) with a dioxy compound selected from those compounds having the following formula:

$$R_3—O—(CH_2)_p—O—R_4$$

wherein $p$ represents a positive integer of from 2 to 10, inclusive, and $R_3$ and $R_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

The dioxy compound is advantageously employed in such a proportion that there are from about 1.2 to about 3 oxy substituents in proportion to the carboxy substituents in the over-all combination of the benzanilide compound and the dioxy compound. Higher or lower proportions can also be employed.

Advantageously, the elevated temperature employed during the earlier part of the condensation is from about 200° C. to about 230° C. However, higher and lower temperatures can also be employed. The temperature depends upon the boiling point of the glycol or glycols employed.

The earlier part of the condensation can advantageously be conducted for from approximately one to two hours in an inert atmosphere.

During the latter part of the condensation, the pressure can advantageously be greatly reduced to form a vacuum, i. e. a pressure of less than about 15 mm. of Hg, and most advantageously of the order of less than about 5 mm. of Hg pressure. During the latter stages of the condensation reaction at the reduced pressure, these conditions can be advantageously maintained for approximately one to five hours. Heating at 250°–300° is advantageous.

Examples of inert atmospheres which can be employed advantageously include nitrogen, hydrogen, helium, etc.

The conditions under which the condensation can be conducted can be varied considerably, depending upon the degree of polyesterification desired, the ultimate properties sought, the stability of the polyester being produced and the use for which the product is intended.

Most advantageously, the benzanilide compound employed in accordance with this invention is the methyl or ethyl diester of 4,4'-dicarboxybenzanilide. Most advantageously, the dioxy compound employed in accordance with this invention is 1,5-pentanediol or 1,6-hexanediol.

Linear polyesters are also encompassed within the scope of this invention which are prepared by the condensation as described above employing a mixture of the above defined dioxy compounds. In addition to employing one or more of such dioxy compounds, one or more ether glycols can also be advantageously employed in a manner analogous to that described in application Serial No. 313,067, filed October 3, 1952, now U. S. Patent 2,744,095, granted May 1, 1956. The ether glycols can be represented by the following formula:

$$R_5—O—(R_7—O)_r—R_7—OR_6$$

wherein $R_7$ represents an alkylene radical containing from 2 to 4 carbon atoms, $r$ represents a positive integer of from 1 to 10 and $R_5$ and $R_6$ each represents a substituent selected from the group consisting of a hydrogen atom and an acyl radical containing from 2 to 4 carbon atoms. Examples of ether glycols which can be employed include diethylene glycol, tetraethylene glycol, bis (4-hydroxybutyl) ether, etc.

The sole use of the shorter chain (less than 5 C atoms) polymethylene glycols in unmodified polyesters results in the formation of polyesters having excessively high melting points resulting in decomposition at or below the melting point. The employment of mixtures of glycols including the introduction of ether glycols results in the formation of polyesters having usefully lower melting points. Mixed glycols also result in the formation of products having a wider range of softening temperatures which is more advantageous in regard to extruding shaped products from the polyesters.

Some of the benzanilide compound employed in accordance with this invention can be replaced with another dibasic carboxy compound such as oxalic acid, carbonic acid, aliphatic dibasic straight chain acids containing from 4 to 20 carbon atoms, aliphatic dibasic branched chain acids, aliphatic dibasic ether acids and aromatic dibasic acids. The manner in which this partial substitution can be accomplished and corresponding polyesters produced is described hereinbelow. Examples of such additional dibasic acidic constituents include the lower alkyl esters of succinic acid, adipic acid, azelaic acid, 2-ethyl suberic acid, 4-isopropyl sebacic acid, diglycollic acid, β-oxydipropionic acid, gamma-oxydibutyric acid, p,p'-sulfonyldibenzoic acid, terephthalic acid, 4,4'-dicarboxybenzophenone, etc.

The employment of a mixture of esters of dibasic acids generally results in some lowering of the softening and melting points of the resulting polyester as well as resulting in the formation of a product having a wider range of softening temperatures. It also decreases the rate of crystallization of the polymer. These properties are advantageous in regard to the formation of extruded products. In fact, this reduction in the rate of crystallization makes these interpolyesters much more advantageously suited for the production of formed products such as photographic film where too rapid crystallization makes it practically impossible on a commercial or large scale basis to quench the hot formed product so as to avoid the inherently rapid crystallization of the unmodified polyesters. As described in greater detail hereinbelow, certain aliphatic and aromatic acid diesters are admirably suited to the production of especially advantageous interpolyesters having exceptionally valuable properties as regards the formation of extruded products such as photographic film.

The products of this invention are linear highly polymeric polyesters having melting points above about 200° C. when $p$ is less than 7, containing the following repeating unit:

$$-O-\overset{O}{\underset{\|}{C}}-\underset{\phantom{x}}{\bigcirc}-NH-CO-\underset{\phantom{x}}{\bigcirc}-\overset{O}{\underset{\|}{C}}-O-(CH_2)_p-$$

wherein $p$ is defined above. As indicated hereinbefore, these polyesters can also contain other repeating units derived from ether glycols and other dibasic acidic compounds. These polyesters are capable of being formed into fibers (such as by melt spinning methods) which can then be cold drawn by conventional means to from about 2 to about 5 times their original spun length whereby these fibers develop strong, elastic and otherwise highly valuable properties.

Catalytic condensing agents which can be advantageously employed in preparing these polyesters are ester-interchange catalysts which include those described in the prior art relating to the preparation of linear highly polymeric polyesters such as those derived from terephthalic acid esters. These condensing agents include those selected from the group comprising the alkali metals, the alkaline earth metals, the oxides of these two groups of metals, the alkoxides containing from 1 to 8 carbon atoms of these two groups of metals, the carbonates and borates of these two groups of metals, lead oxide, cerium oxide, cobalt acetate, germanium compounds and compounds having the formulas:

$M(Al(OR)_4)$
$M(HZr(OR)_6)$
$M'(HZr(OR)_6)_2$
$MH(Ti(OR)_6)$
$M_2(Ti(OR)_6)$
$M'(HTi(OR)_6)_2$
$M'(Ti(OR)_6)$
$(RR'R''R''')N)_2(Ti(OR)_6)$
$(RR'R''R''')N)H(Ti(OR)_6)$
$Ti(OR)_4$
$PbR_4$ et cetera, wherein M represents an alkali metal, M' represents an alkaline earth metal selected from the group consisting of magnesium, calcium and strontium, R represents an alkyl group containing from 1 to 6 carbon atoms R', R'' and R''' each represents a member of the group consisting of R and an aryl group of the benzene series containing from 6 to 9 carbon atoms.

Advantageously, from about 0.005% to about 0.2% of these catalysts based on the weight of the reactants being condensed can be employed. Higher or lower percentages can also be employed. Generally, from about 0.01 to about 0.06% of the catalytic condensing agent can be advantageously employed based on the weight of the materials being condensed.

The condensation reaction can be carried out in the presence or absence of a solvent. Inert, high-boiling compounds such as diphenyl, diphenyl ether, mixed tolyl sulfones, chlorinated naphthalene, chlorinated diphenyl, dimethylsulfolane, etc. can be used as the reaction medium. Most advantageously no solvent is employed.

It has been found that the type of catalyst employed in preparing the polyesters of this invention has an important bearing upon the qualities of the final product. Although most of the catalysts cited in the prior art can be used, it has been found that certain catalysts give superior results. Examples of catalysts which are especially efficacious are those which are described in applications Serial Nos. 313,072 and 313,078, filed October 3, 1952, now U. S. Patents 2,720,502, granted October 11, 1955, and 2,720,507, granted October 11, 1955, respectively. Other efficacious catalysts are also described in recent publications and various patents.

It is important to exclude oxygen and moisture at all stages of the condensation reaction. The inert atmospheres described above are employed for accomplishing this result. Substantially anhydrous reactants can also be advantageously employed, although this is not essential, especially if any water is removed in the earlier stages of the condensation.

The preparation of 4,4'-dicarboxybenzanilide esters as novel compounds provided by this invention can be illustrated by the following example:

*Example 1.—4,4'-dicarbethoxybenzanilide*

One hundred and twenty-five grams (0.59 mole) p-carbethoxybenzoyl chloride was stirred into 240 grams of dry pyridine. After cooling to 10°, 97 grams (0.59 mole) ethyl p-amino benzoate was added slowly with stirring. The warm reaction mixture was allowed to stand for 2 hours and was then poured into ice water. The white crystalline precipitate was filtered by suction and washed well with water. The product was recrystallized from ethyl alcohol using decolorizing carbon. The yield of white, crystalline 4,4'-dicarbethoxybenzanilide, M. P. 166°–168°, was 175 grams, which is 88% of the theoretical amount.

*Analysis.*—Calculated for $C_{19}H_{19}O_5N$: C, 66.9; H, 5.5; N, 4.1. Found: C, 66.9; H, 5.5; N, 4.2.

Another example of how such esters can be employed is as follows:

*Example 2.—4,4'-dicarbethoxybenzanilide*

Three hundred and forty-three grams (2.08 moles) of ethyl p-amino benzoate was dissolved in four liters of benzene. Two liters of water were added and then, with cooling (5°) and vigorous stirring, one-half of 476 grams (2.08 moles) of p-carbethoxybenzoyl chloride (200 cc.) was added at once. After stirring for five minutes, 200 cc. of a solution containing 85.8 grams of sodium hydroxide (2.08 moles) in 390 cc. of water was added. One-half of the remaining acid chloride was then added, followed in 5 minutes by one-half of the remaining alkali solution; and so on until all of these reagents had been added. The reaction mixture was stirred for 10 minutes and filtered by suction. The product was thoroughly washed with water and then twice recrystallized from ethyl alcohol. The yield of white, crystalline 4,4'-dicarbethoxybenzanilide, M. P. 166°–168°, was 620 grams, which is 88.5% of the theoretical yield.

Other lower alkyl esters of 4,4'-dicarboxybenzanilide can be similarly prepared employing the corresponding alkyl homologs of the reactants used in the above two examples. Likewise, the aryl analogs can be employed to form the aryl esters. Any of these esters can be hydrolyzed by standard procedures to form the free acid 4,4'-dicarboxybenzanilide. However, the esters of this acid are most advantageously employed in the preparation of polyesters.

The preparation of the polyesters of this invention can be further illustrated by the following examples. In addition to these examples, it is apparent that other variations and modifications thereof can be adapted to obtain similar results.

*Example 3.—Polyester of 4,4'-dicarbethoxybenzanilide with 1,5-pentanediol*

Two hundred grams of 4,4'-dicarbethoxybenzanilide was mixed with one hundred grams of 1,5-pentanediol which contained one cc. of sodium hydrogen titanium butoxide catalyst, i. e. $NaHTi(OC_4H_9)_6$ (this catalyst was prepared by adding 14.78 grams of $Ti(OC_4H_9)_4$ to a solution of 1 gram of sodium in 100 cc. of n-butyl alcohol, after which the resulting solution was diluted to 200 cc.). The reaction mixture was melted together in a reaction vessel equipped with a short distillation column and an inlet tube while nitrogen was bubbled through. Ethanol started to distill out when a temperature of 205° was reached by the oil bath used for heating the reaction vessel. The bath temperature was kept at 230° C. for about one hour and then a stirrer was attached to the reaction flask and a water-pump vacuum applied to the system. During the next twenty minutes pentanediol distilled. A mechanical pump was then attached and the reaction mixture was stirred at 0.2 mm. of Hg pressure and a bath temperature of 250° C. After two and one-half hours under these conditions, the polymer had become very viscous. The reaction was stopped. Upon cooling, the polymer crystallized with unusual rapidity. It was practically colorless. It had an intrinsic viscosity of 0.70 in a 60% phenol-40% s-tetrachlorethane solution. Its melting point was 215° C.

*Example 4.—Polyester of 4,4'-dicarbethoxybenzanilide with 1,5-pentanediol*

The condensation reaction described in Example 3 was repeated except that an equivalent amount of

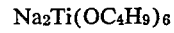

$Na_2Ti(OC_4H_9)_6$ was employed as the catalyst. See copending application Serial No. 313,072 for a description of this catalyst. The product obtained was essentially identical to that described in Example 3 and could be drawn into fibers capable of cold-drawing and possessing characteristics of excellent dimensional stability and low water absorption.

*Example 5.—Polyester of 4,4'-dicarbethoxybenzanilide with 1,6-hexanediol*

Two hundred grams of 4,4'-dicarbethoxybenzanilide, one hundred and forty grams of 1,6-hexanediol and two cc. of sodium hydrogen titanium butoxide catalyst (see Example 3) were heated under nitrogen. The equipment and conditions were essentially as described in Example 3. Ethanol distilled out during the first hour at a bath temperature of 200–250° C. The reaction flask was then equipped with a stirrer and evacuated by means of a water pump. After twenty minutes, a mechanical pump was attached and the mixture heated 285–290° at 0.1 mm. of Hg pressure for one hour and ten minutes. The reaction was stopped by cooling. The resulting polymer crystallized very rapidly. It was very light colored. It was found to have an intrinsic viscosity of 0.63 in 60% phenol-40% s-tetrachlorethane solution. Film prepared from this polyester by extrusion and cold-drawing has superior resistance to dimensional change despite changes in atmospheric humidity or immersion in aqueous solutions.

*Example 6.—Polyester of 4,4'-dicarbethoxybenzanilide with 1,6-hexanediol*

The procedure described in Example 5 was repeated except an equivalent amount of $NaH(Zr(OC_4H_9)_6)$ was employed as the catalyst. This catalyst is described in application Serial No. 313,074, filed October 3, 1952, now U. S. Patent 2,720,504, granted October 11, 1955. The product obtained was essentially the same as that described in Example 5.

*Example 7.—Polyester of 4,4'-dicarbobutoxybenzanilide with 1,6-hexanediol*

The procedure described in Example 5 was repeated except that an equivalent amount of

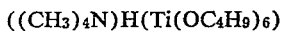
$$((CH_3)_4N)H(Ti(OC_4H_9)_6)$$

was employed. This catalyst is described in application Serial No. 313,075, filed on October 3, 1952, now U. S. Patent 2,727,881, granted December 20, 1955. The product obtained was essentially the same as that described in Example 5.

Other esters of 4,4'-dicarboxybenzanilide can be employed in lieu of the esters described in the preceding examples, e. g., the dibutyl esters, the dihexyl esters, the dimethyl esters, etc. Modified polyesters can be employed using numerous other dibasic acid esters. Mixed glycols can also be employed wherein the glycols can include ether glycols as well as polymethylene glycols, e. g. diethylene glycol.

The products described in the above examples have been drawn, extruded, or otherwise formed, into various fibers, films, and other shaped and molded products having toughness, dimensional stability, high softening point, good elastic recovery from elongation, good work recovery, low stress-relaxation, and other useful properties.

INTERPOLYESTERS FROM ADMIXED AROMATIC ACIDS

Another embodiment of our invention as discussed above relates to a process for preparing novel interpolyesters which comprises (A) condensing about 10 mole proportions of a benzanilide compound having the formula:

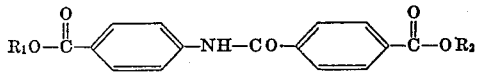

wherein $R_1$ and $R_2$ each represents a substituent selected from the group consisting of an alkyl radical containing from 1 to 6 carbon atoms, plus from about 1 to about 10 mole proportions of a lower alkyl diester wherein the alkyl radicals contain from 1 to 6 carbon atoms of an aromatic dibasic acid containing from 1 to 2 phenylene nuclei wherein each of the carbalkoxy radicals is attached to a phenylene nucleus in meta or para relationship to the other valence bond on the phenylene nucleus, said lower alkyl diester of said aromatic dibasic acid being capable of being condensed with hexamethylene glycol to form a polyester having a melting point above about 125° C., (B) with a dioxy compound selected from those compounds having the following formula:

$$R_3-O-(CH_2)_p-O-R_4$$

wherein $p$ represents a positive integer of from 2 to 10, inclusive, and $R_3$ and $R_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

The details of how this process can be conducted are the same as those described hereinbefore for the unmodified polyester except that a mixture of acid esters is employed.

We have found that the interpolyesters derived from mixed acid diesters which include these aromatic diesters are especially suited for the production of certain shaped products such as photographic film where the unmodified polyesters described above cannot be advantageously employed since they possess such a high rate of crystallization that it is virtually impossible on an industrial or large scale production basis to quench the hot shaped product so as to avoid the formation of a hard, brittle, crystalline end product. This is especially true when film with a thickness on the order of about 0.050 inch is extruded. In preparing many useful film products, it is necessary to make the originally extruded film considerably thicker than that which is eventually desired in order to take into account the lengthwise and sidewise stretching which is necessary in order to form an oriented structure.

It has been discovered that the particular interpolyesters just described avoid this difficulty. The products obtained can be quenched by ordinary readily workable means to produce shaped end products having desirable physical characteristics including high molecular weights, melting points above about 125° C., etc. Most advantageously, these modified interpolyester products are prepared from selected mixed acid esters and a glycol whereby the end products will have melting points on the order of about 200° C. or higher. Films prepared from these interpolyesters by extrusion can be readily quenched and then stretched lengthwise and crosswise, followed by heat setting to form an oriented structure having excellent physical properties including tensile strength approaching 10,000 pounds per square inch or higher, an elongation at the breaking point of up to about 25 percent or more, a desirable swell-shrink amplitude, a high resistance to tearing or repeated folding, etc.

The products of this embodiment of the invention are linear highly polymeric interpolyesters having melting points above about 125° C. and which contain in the interpolyester configuration a ratio of about ten of the following repeating units:

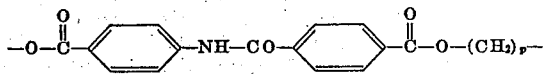

to each one to about 10 of a repeating unit derived by deleting the hydrogen atom from the left hand carboxyl radical and replacing the hydrogen atom of the right hand carboxyl radical with a —$(CH_2)_p$— radical in the structural formula of an aromatic dibasic acid containing from 1 to 2 phenylene nuclei wherein each of the carboxy radicals is attached to a phenylene nucleus in a position selected from those consisting of the meta and para positions in relationship to the other valence bond on the phenylene nucleus, said interpolyester being capable of molecular orientation to form a shaped product having a tensile strength of at least 5000 pounds per square inch and a linear elongation of at least 10 percent.

Examples of dibasic aromatic acid diesters which can be employed in accordance with this embodiment of the invention include diesters of isophthalic acid, m,p'-sulfonyl dibenzoic acid, p,p'-diphenic acid, p,p'-dicarboxybenzophenone, bis(p-carboxyphenoxy)-1,4-n-butane, 1,4-di(carboxymethyl)benzene, 4,4' - di(carboxymethyl)biphenyl, 1,4-di(carboxyethoxy)benzene, 4,4'-di(carboxyethoxy)biphenyl, bis(p-carboxyphenylmethyl) ether, etc.

The preparation of the interpolyesters described in this embodiment of our invention can be further illustrated by the following examples. In addition to the examples, it is apparent that other variations and modifications thereof can be adapted to obtain similar results.

The following examples each employ this general procedure:

The reactant esters and glycols were melted together with the ester interchange catalyst in a reaction vessel containing an atmosphere of nitrogen. Heat was supplied by means of an oil bath which was maintained at the temperature shown in each example during the course of the two stages of each reaction. The period of time during which the temperature was maintained for each stage is indicated for each example. At the end of the first stage of the condensation, a vacuum pump was connected to the reaction vessel and the reaction mixture was stirred under reduced pressure of less than about 5 mm. of Hg pressure. Stirring was maintained during the entire course of the reaction in each instance. The second stage differs from the first stage both as regards the temperature and the pressure. After the second stage was completed, the reaction vessel was removed from the heating bath and allowed to cool. The remarks set forth in each example describe the product obtained.

*Example 8.—Polyester from dibutyl ester of p,p'-sulfonyldibenzoic acid and 4,4'-dicarbethoxybenzanilide with 1,6-hexanediol*

Reactants:
    4,4'-dicarbethoxybenzanilide (205 g. or 90 mol percent)
    Dibutyl ester of p,p'-sulfonyldibenzoic acid (28 g. or 10 mol percent)
    1,6-hexanediol (140 g.)
Catalyst:
    1 cc. NaHTi(OC$_4$H$_9$)$_6$
    (The catalyst was prepared by adding 14.78 g. of Ti(OC$_4$H$_9$)$_4$ to a solution of 1 g. of Na in 100 cc. of n-butyl alcohol, after which the resulting solution was diluted to 200 cc.)
Temperature:
    I stage, 230 C.
    II stage, 260 C.
Time:
    I stage, 90 minutes
    II stage, 180 minutes (Hi Vac pump)
Remarks:
    (1) Product crystallized rapidly
    (2) Light color
    (3) Intrinsic viscosity in 60:40 phenol:s-tetrachloroethane, 0.65
    (4) Melting point, 215 C.

*Example 9—Polyester from dibutyl ester of p,p'-disulfonyldibenzoic acid and 4,4'-dicarbethoxybenzanilide with 1,6-hexanediol*

Reactants:
    4,4'-dicarbethoxybenzanilide (700 g. or 80 mol percent)
    Dibutyl ester of p,p'-disulfonyldibenzoic acid (217 g. or 20 mol percent)
    1,6-hexanediol (440 g.)
Catalyst:
    3 cc. NaHTi(OC$_4$H$_9$)$_6$
    (See Example 8)
Temperature:
    I stage, 250 C.
    II stage, 260 C.
Time:
    I stage, 60 minutes
    II stage, 60 minutes (water pump vacuum); 3.3 hours (Hi Vac pump)
Remarks:
    (1) Crystallizes less rapidly than the product from Example 8
    (2) Intrinsic viscosity in 60:40 phenol:s-tetrachloroethane, 0.76
    (3) Melting point, 230 C.

*Example 10.—Polyester from dibutyl ester of p,p'-sulfonyldibenzoic acid and 4,4'-dicarbethoxybenzanilide with 1,6-hexanediol*

Reactants:
    4,4'-dicarbethoxybenzanilide (640 g. or 75 mol percent)
    Dibutyl ester of p,p'-sulfonyldibenzoic acid (260 g. or 25 mol percent)
    1,6-hexanediol (440 g.)
Catalyst:
    3 cc. NaHTi(OC$_4$H$_9$)$_6$
    (See Example 8)
Temperature:
    I stage, 230 C.
    II stage, 240 C.
Time:
    I stage, 90 minutes
    II stage, 90 minutes (water pump vacuum); 5 hours (Hi Vac pump)
Remarks:
    (1) The rate of crystallization is sufficiently slow that the material can be easily extruded, quenched, and stretched to produce a sheet having very good physical properties
    (2) The lower temperature yields a whiter polymer
    (3) Intrinsic viscosity in 60:40 phenol:s-tetrachloroethane, 0.61
    (4) Melting point, 210 C.

*Example 11.—Polyester from dibutyl ester of p,p'-sulfonyldibenzoic acid and 4,4'-dicarbethoxybenzanilide with 1,6-hexanediol*

Reactants:
    4,4'-dicarbethoxybenzanilide (47.7 g. or 70 mol percent)
    Dibutyl ester of p,p'-sulfonyldibenzoic acid (11.6 g. or 30 mol percent)
    1,6-hexanediol (30 g.)
Catalyst:
    0.2 cc. NaHTi(OC$_4$H$_9$)$_6$
    (See Example 8)
Temperature:
    I stage, 250 C.
    II stage, 270 C.
Time:
    I stage, 60 minutes
    II stage, 90 minutes
Remarks:
    (1) Crystallizes nicely
    (2) Intrinsic viscosity in 60:40 phenol:s-tetrachloroethane, 0.72
    (3) Melting point, 200 C.

*Example 12.—Polyester from dimethyl terephthalate and 4,4'-dicarbethoxybenzanilide with 1,6-hexanediol*

Reactants:
    4,4'-dicarbethoxybenzanilide (42.5 g. or 50 mol percent)
    Dimethyl terephthalate (24 g. or 50 mol percent)
    1,6-hexanediol (40 g.)
Catalyst:
    0.2 cc. NaHTi(OC$_4$H$_9$)$_6$
    (See Example 8)
Temperature:
    I stage, 250 C.
    II stage, 250 C.
Time:
    I stage, 60 minutes
    II stage, 75 minutes
Remarks:
    (1) Crystallizes very rapidly to a white porcelain-like product
    (2) Intrinsic viscosity in 60:40 phenol:s-tetrachloroethane, 0.88
    (3) Melting point, 140 C.

*Example 13.—Polyester from dimethyl terephthalate and 4,4'-dicarbethoxybenzanilide with 1,5-pentanediol*

Reactants:
    4,4'-dicarbethoxybenzanilide (42.5 g. or 50 mol percent)
    Dimethyl terephthalate 24 g. or 50 mol percent)
    1,5-pentanediol (50 g.)

11

Catalyst:
    0.2 cc. NaHTi(OC₄H₉)₆
    (see Example 8)

Temperature:
    I stage, 250° C.
    II stage, 250° C.

Time:
    I stage, 60 minutes
    II stage, 30 minutes (water pump vacuum); 150 minutes (Hi Vac pump)

Remarks:
    (1) Does not crystallize
    (2) Product is a clear, tough glass—this should be a good material for molding composition
    (3) When compared to the products from Example 12 and Example 14, the effect of the even or odd number of carbon atoms in the glycol upon the crystallization of the product can be seen

*Example 14.—Polyester from dimethyl terephthalate and 4,4'-dicarbethoxybenzanilide with 1,4-butanediol*

Reactants:
    4,4'-dicarbethoxybenzanilide
        (42.5 g. or 50 mol percent)
    Dimethyl terephthalate
        24 g. or 50 mol percent)
    1,4-butanediol (50 g.)

Catalyst:
    0.2 cc. NaHTi(OC₄H₉)₆
    (see Example 8)

Temperature:
    I stage, 250 C.
    II stage, 250–260 C.

Time:
    I stage, 60 minutes
    II stage, 30 minutes (250 C.); 90 minutes (260 C.)

Remarks:
    (1) Crystallizes to a white porcelain-like material
    (2) Can quench threads in air
    (3) Intrinsic viscosity in 60:40 phenol: s-tetrachloroethane, 0.66
    (4) Melting point, 210 C.

*Example 15.—Polyester from dibutyl ester of p,p'-sulfonyldibenzoic acid and 4,4'-dicarbethoxybenzanilide with 1,5-pentanediol*

Dibutyl ester of p,p'-sulfonyldibenzoic acid (157.5 grams), 4,4'-dicarbethoxybenzanilide (42.5 grams) and 1,5-pentanediol (150 grams) were melted together under nitrogen in apparatus as described in Example 3 and 1 cc. of sodium hydrogen titanium butoxide as the catalyst added. The heating bath was kept at 240° C. for one hour while the ethanol distilled. A stirrer and a water pump were then attached to the apparatus. During the next twenty minutes pentanediol was removed under a vacuum. A mechanical pump was then attached and, with continued stirring, the reaction mixture was heated at a bath temperature of 260–270° C. and a pressure of 0.1–0.2 mm. for forty minutes. The resulting white polymer cold-drew well. It was crystalline and had an intrinsic viscosity of 0.70 in a 60:40 s-tetrachloroethane-phenol mixture.

*Example 16.—Polyester from dibutyl ester of p,p'-sulfonyldibenzoic acid and 4,4'-dicarbethoxybenzanilide with 1,5-pentanediol and 1,10-decanediol*

The procedure described in Example 15 was repeated exactly except that K(Al(OC₂H₅)₄) was employed as the catalyst and a mixture of glycols was employed whereby one half (75 grams) of 1,5-pentanediol used in Example 8 was replaced with 125 grams of decamethylene glycol. The catalyst is described in application Serial No. 313,077, filed on October 3, 1952, now U. S. Patent 2,720,506, granted October 11, 1955. The product obtained was essentially the same as that described in Example 8 except for a lower and wider softening temperature range. This product was especially useful in extrusion molding of shaped products.

*Example 17.—Polyester from dibutyl ester of p,p'-sulfonyldibenzoic acid and 4,4'-dicarbethoxybenzanilide with 1,5-pentanediol and 1,3-propyleneglycol*

The procedure described in Example 15 was repeated exactly except that dibutyl tin dibutoxide was employed as the catalyst and the methyl ester of 4,4'-dicarboxybenzanilide was employed besides using a mixture of glycols consisting of replacing 75 grams of 1,5-pentanediol with 60 grams of 1,3-butanediol. This catalyst is described in application Serial No. 313,078, filed October 3, 1952, now U. S. Patent 2,720,507, granted October 11, 1955. The product obtained was essentially the same as that described in Example 15 except for a lower and wider softening temperature range.

INTERPOLYESTERS FROM ADMIXED ALIPHATIC ACIDS

Another embodiment of our invention as discussed above relates to a process for preparing novel interpolyesters which comprises (A) condensing about 20 mole proportions of a benzanilide compound having the formula:

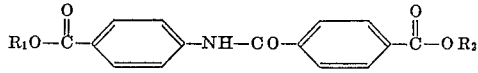

wherein $R_1$ and $R_2$ each represents a substituent selected from the group consisting of an alkyl radical containing from 1 to 6 carbon atoms, plus from about 1 to 6 mole proportions of a lower alkyl diester of an aliphatic acid having the formula:

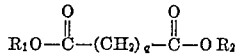

wherein $R_1$ and $R_2$ are each defined above and $q$ represents a positive integer of from 2 to 10 carbon atoms, (B) with a dioxy compound selected from those compounds having the following formula:

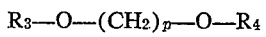

wherein $p$ represents a positive integer of from 2 to 10, inclusive, and $R_3$ and $R_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

The details of how this process can be conducted are the same as those described above for the unmodified polyester except that a mixture of acid esters is employed.

We have found that the interpolyesters derived from mixed acid diesters which include these aliphatic diesters are especially suited for the production of certain shaped products such as photographic film where the unmodified polyesters described above cannot be advantageously employed since they possess such a high rate of crystallization that it is virtually impossible on an industrial or large scale production basis to quench the hot shaped product so as to avoid the formation of a hard, brittle, crystalline end product. This is especially true when film with a thickness on the order of about 0.050 inch is extruded. In preparing many useful film products it is necessary to make the originally extruded film considerably thicker than that which is eventually desired in order to take into account the lengthwise and sidewise stretching which is necessary in order to form an oriented structure.

It has been discovered that the particular interpolyesters just described avoid this difficulty. The products obtained can be quenched by ordinary readily workable means to produce shaped end products having desirable physical characteristics including high molecular weights, melting points above about 125° C., etc. Most advantageously, these modified interpolyester products are prepared from selected mixed acid esters and a glycol whereby the end products will have melting points on the order of about 200° C. or higher. Films prepared from these interpolyesters by extrusion can be readily quenched and then stretched lengthwise and crosswise, followed by heat setting to form an oriented structure having excellent physical properties including tensile strength approaching 10,000 pounds per square inch or higher, an elongation at the breaking point of up to about 25 percent or more, a desirable swell-shrink amplitude, a high resistance to tearing or repeated folding, etc.

The products of this embodiment of the invention are linear highly polymeric interpolyesters having melting points above about 125° C. and which contain in the interpolyester configuration a ratio of about 20 of the following repeating units:

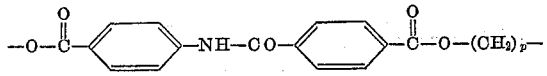

to each 1 to about 6 of a repeating unit having the following formula:

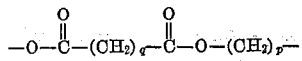

wherein $p$ and $q$ are defined hereinabove, all of said repeating units being connected by an ester linkage, said interpolyester being capable of molecular orientation to form a shaped product having a tensile strength of at least 5000 pounds per square inch and a linear elongation of at least 10 percent.

Examples of dibasic aliphatic acid diesters which can be employed in accordance with this embodiment of the invention include esters of succinic acid, glutaric acid, sebacic acid, azelaic acid, suberic acid, adipic acid, pimelic acid, etc.

The preparation of the interpolyesters described in this embodiment of our invention can be further illustrated by the following examples. In addition to the examples, it is apparent that other variations and modifications thereof can be adapted to obtain similar results.

The following examples each employ this general procedure: The reactant esters and glycols were melted together with the ester interchange catalyst in a reaction vessel containing an atmosphere of nitrogen. Heat was supplied by means of an oil bath which was maintained at the temperature shown in each example during the course of the two stages of each reaction. The period of time during which the temperature was maintained for each stage is also indicated for each example. At the end of the first stage of the condensation, a vacuum pump was connected to the reaction vessel and the reaction mixture was stirred under reduced pressure of less than about 5 mm. of Hg pressure. Stirring was maintained during the entire course of the reaction in each instance. The second stage differs from the first stage both as regards the temperature and the pressure. After the second stage was completed, the reaction vessel was removed from the heating bath and allowed to cool. The remarks set forth in each example describe the product obtained.

The catalyst employed in the following examples is [NaHTi(OC$_4$H$_9$)$_6$] which was prepared by dissolving 1 g. Na in 200 cc. n-butyl alcohol and then adding 14.78 g. Ti(OC$_4$H$_9$)$_4$. The intrinsic viscosities were determined in a 60:40 mixture of phenol:tetrachloroethane.

*Example 18.—Polyester from diethyl succinate and 4,4'-dicarbethoxybenzanilide with 1,6-hexanediol*

Reactants:
    64 g. 4,4'-dicarbethoxybenzanilide (75 mol percent)
    10.9 g. diethyl succinate (25 mol percent)
    40 g. 1,6-hexanediol
Catalyst:
    0.5 cc.
Temperature:
    I stage, 250° C.
    II stage, 250° C.
Time:
    I stage, 30 minutes
    II stage, 65 minutes
Remarks:
    (1) Product crystallized to a white, porcelain-like material
    (2) Intrinsic viscosity, 0.50
    (3) Melting point, 215° C.

*Example 19.—Polyester from diethyl succinate and 4,4'-dicarbethoxybenzanilide with 1,6-hexanediol*

Reactants:
    72.5 g. 4,4'-dicarbethoxybenzanilide (85 mol percent)
    6.5 g. diethyl succinate (15 mol percent)
    40 g. 1,6-hexanediol
Catalyst:
    0.5 cc.
Temperature:
    I stage, 250–285° C.*
    II stage, 285° C.
Time:
    I stage, 30 minutes
    II stage, 65 minutes
Remarks:
    (1) *The oil bath temperature had to be raised due to crystallization at the lower oil bath temperature
    (2) Polymer crystallized to a porcelain-like white mass
    (3) Intrinsic viscosity, 0.71
    (4) Melting point, 238° C.

*Example 20.—Polyester from diethyl succinate and 4,4'-dicarbethoxybenzanilide with 1,6-hexanediol*

Reactants:
    81 g. 4,4'-dicarbethoxybenzanilide (95 mol percent)
    2.2 g. diethyl succinate (5 mol percent)
    40 g. 1,6-hexanediol
Catalyst:
    0.5 cc.
Temperature:
    I stage, 250–285° C.*
    II stage, 285° C.
Time:
    I stage 30 minutes
    II stage 65 minutes
Remarks:
    (1) *Polymer solidified in 250° C. oil bath and melted in 285° C. bath
    (2) Product was a white porcelain-like material
    (3) Intrinsic viscosity, 0.62
    (4) Melting point, 246° C.

*Example 21.—Polyester from dimethylsebacate and 4,4'-dicarbethoxybenzanilide with 1,6-hexanediol*

Reactants:
    64 g. 4,4'-dicarbethoxybenzanilide (75 mol percent)
    14.4 g. dimethylsebacate
    40 g. 1,6-hexanediol
Catalyst:
    0.5 cc.
Temperature:
    I stage, 250–270° C.
    II stage, 270° C.

Time:
    I stage, 30 minutes
    II stage, 60 minutes
Remarks:
    (1) White crystalline polymer
    (2) Intrinsic viscosity, 0.83
    (3) Melting point, 209° C.

*Example 22.—Polyester from dimethylsebacate and 4,4'-dicarbethoxybenzanilide with 1,6-hexanediol*

Reactants:
    72.5 g. 4,4'-dicarbethoxybenzanilide (85 mol percent)
    8.6 g. dimethylsebacate (15 mol percent)
    40 g. 1,6-hexanediol
Catalyst:
    0.5 cc.
Temperature:
    I stage, 250–270° C.
    II stage, 270° C.
Time:
    I stage, 30 minutes
    II stage, 60 minutes
Remarks:
    (1) White, crystalline polymer
    (2) Intrinsic viscosity, 0.66
    (3) Melting point, 218° C.

*Example 23.—Polyester from dimethylsebacate and 4,4'-dicarbethoxybenzanilide with 1,6-hexanediol*

Reactants:
    81 g. 4,4'-dicarbethoxybenzanilide
    2.9 g. dimethylsebacate
    40 g. 1,6-hexanediol
Catalyst:
    0.5 cc.
Temperature:
    I stage, 250–270° C.
    II stage, 270° C.
Time:
    I stage, 30 minutes
    II stage, 60 minutes
Remarks:
    (1) White, crystalline polymer
    (2) Intrinsic viscosity, 0.69
    (3) Melting point, 246° C.

The interpolycarbonates described in the preceding examples all possess the property of slower crystallization as has been described hereinabove. It is readily obvious that other glycols and other modifying aliphatic dibasic acid diesters as well as different esters of 4,4'-dicarboxybenzanilide can be employed in accordance with the procedures set forth in the preceding examples.

Any of the processes described herein above can be carried out in the solid phase as well as in the liquid phase as described. Moreover, continuous processes employing either phase can be advantageously employed. For example, the benzanilide compound, a glycol, and a catalyst can be introduced into the upper end of a large cylindrical reaction vessel equipped with an agitating means, provision for inert gas inlet and outlet, and a discharge outlet at the lower end of the vessel. Heat can be applied to such an apparatus until an initial charge has been carried through stage I of the condensation as described above. Then additional reactants and catalysts can be gradually introduced into the upper end as partially condensed product is gradually removed from the lower end of the apparatus. The partial condensate can then be introduced into similar apparatus provided with a means for maintaining a high vacuum until stage II is completed. Other continuous processes can also be adapted to the processes of this invention.

What we claim as our invention and desire to secure by Letters Patent of the United States is:

1. A process for preparing a linear polyester comprising (A) condensing a benzanilide compound having the formula:

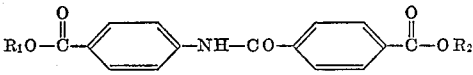

wherein $R_1$ and $R_2$ each represents a substituent selected from the group consisting of an alkyl radical containing from 1 to 6 carbon atoms, (B) with a dioxy compound having the formula:

$$R_3-O-(CH_2)_p-O-R_4$$

wherein $p$ represents a positive integer of from 2 to 10 inclusive and $R_3$ and $R_4$ each represents a substituent selected from the group consisting of a hydrogen atom and a saturated acyl radical containing from 2 to 4 carbon atoms, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) in an inert atmosphere, and (F) conducting the latter part of the condensation at a very low pressure of the inert atmosphere.

2. A process as defined in claim 1 wherein the elevated temperature is increased gradually during the course of the condensation up to a temperature of from about 250° C. to about 300° C.

3. A process as defined in claim 2 wherein the ester-interchange catalyst is employed in an amount of from about 0.005% to about 0.2%, based on the weight of the materials being condensed.

4. A process as defined in claim 3 wherein the dioxy compound is employed in such a proportion that there are from about 1.2 to about 3 oxy substituents in proportion to the carboxy substituents in the over-all combination of the benzanilide compound and the dioxy compound.

5. A process as defined in claim 4 wherein elevated temperature employed during the earlier part of the condensation is from about 200° C. to about 230° C. and the low pressure defined under (F) is less than about 15 mm. of Hg pressure.

6. A process as defined in claim 5 wherein the polyhydroxy compound is a glycol having the formula:

$$HO-(CH_2)_p-OH$$

wherein $p$ is a positive integer of from 2 to 10.

7. A process as defined in claim 6 wherein the inert atmosphere is nitrogen and all materials employed in the process are substantially anhydrous.

8. A process as defined in claim 7 wherein the glycol is 1,5-pentamethylene glycol.

9. A process as defined in claim 7 wherein the glycol is 1,6-hexamethylene glycol.

10. A linear highly polymeric polyester having a melting point above about 200° C. when $p$ is less than 7, containing the following repeating unit:

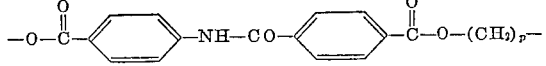

wherein $p$ represents a positive integer of from 2 to 10, all of said repeating units being connected by an ester linkage, said polyester being capable of being spun into fibers which can be cold drawn to from about 2 to 5 times their originally spun length thereby developing an oriented structure.

11. A compound represented by the following general formula:

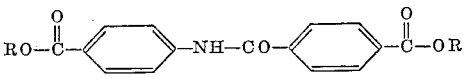

wherein R represents a substituent selected from the group consisting of a hydrogen atom, an alkyl radical containing from 1 to 10 carbon atoms and an aryl radical of the benzene series containing from 6 to 9 carbon atoms.

12. 4,4'-dicarbomethoxybenzanilide.
13. 4,4'-dicarboethoxybenzanilide.
14. A process for preparing a linear interpolyester comprising (A) condensing about 10 mole proportions of a benzanilide compound having the formula:

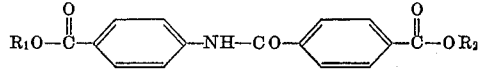

wherein $R_1$ and $R_2$ each represents a substituent selected from the group consisting of an alkyl radical containing from 1 to 6 carbon atoms, plus from about 1 to about 10 mole proportions of a lower alkyl diester wherein the alkyl radicals contain from 1 to 6 carbon atoms of a different aromatic dibasic acid containing from 1 to 2 phenylene nuclei wherein each of the carbalkoxy radicals is attached to a phenylene nucleus in meta or para relationship to the other valence bond on the phenylene nucleus, said lower alkyl diester of said aromatic dibasic acid being capable of being condensed with hexamethylene glycol to form a polyester having a melting point about about 125° C., (B) with a dioxy compound selected from those compounds having the following formula:

$$R_3\text{—O—}(CH_2)_p\text{—O—}R_4$$

wherein $p$ represents a postive integer of from 2 to 10, inclusive, and $R_3$ and $R_4$ each represents a substituent selected from the group consisting of a hydrogen atom and a saturated acyl radical containing from 2 to 4 carbon atom, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

15. A linear highly polymeric interpolyester having a melting point above about 125° C containing in the interpolyester configuration a ratio of about 10 of the following benzanilide repeating units:

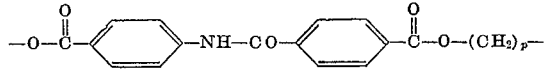

wherein $p$ represents a positive integer of from 2 to 10, to each one to about 10 of a repeating unit derived by deleting the hydrogen atom from the left hand carboxyl radical and replacing the hydrogen atom of the right hand carboxyl radical with a —$(CH_2)_p$— radical in the structural formula of a different aromatic dibasic acid containing from 1 to 2 phenylene nuclei wherein each of the carboxy radicals is attached to a phenylene nucleus in a position selected from those consisting of the meta and para positions in relationship to the other valence bond on the phenylene nucleus, said interpolyester being capable of molecular orientation to form a shaped product having a tensile strength of at least 5000 pounds per square inch and a linear elongation of at least 10 percent.

16. An interpolyester as defined in claim 15 wherein the ratio is about 30 benzanilide repeating units (wherein $p$ is 6) to about 10 of the following repeating unit:

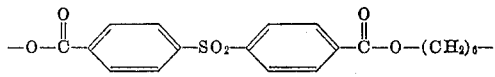

17. A process for preparing a linear interpolyester comprising (A) condensing about 20 mole proportions of a benzanilide compound having the formula:

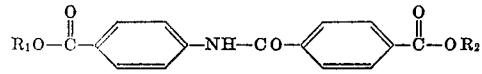

wherein $R_1$ and $R_2$ each represents a substituent selected from the group consisting of an alkyl radical containing from 1 to 6 carbon atoms, plus from about 1 to 6 mole proportions of a lower alkyl diester of an aliphatic acid having the formula:

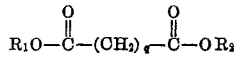

wherein $R_1$ and $R_2$ are each defined above the $q$ represents a positive integer of from 2 to 10 carbon atoms, (B) with a dioxy compound selected from those compounds having the following formula:

$$R_3\text{—O—}(CH_2)_p\text{—O—}R_4$$

wherein $p$ represents a positive integer of from 2 to 10, inclusive, and $R_3$ and $R_4$ each represents a substituent selected from the group consisting of a hydrogen atom and a saturated acyl radical containing from 2 to 4 carbon atoms, the dioxy compound being employed in such a proportion that there is at least an equivalent amount of oxy substituents in proportion to the carboxy substituents in the over-all combination of the benzanilide compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

18. A linear highly polymeric interpolyester having a melting point above about 125° C. containing in the interpolyester configuration a ratio of about 20 of the following benzanilide repeating units:

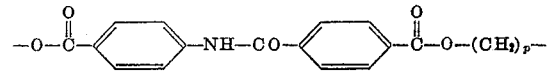

to each 1 to about 6 of a repeating unit having the following formula:

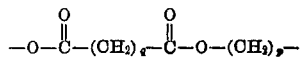

wherein $p$ and $q$ each represents a positive integer of from 2 to 10, all of said repeating units being connected by an ester linkage, said interpolyester being capable of molecular orientation to form a shaped product having a tensile strength of at least 5000 pounds per square inch and a linear elongation of at least 10 percent.

References Cited in the file of this patent
UNITED STATES PATENTS
2,356,702   Schlack _____ Aug. 22, 1944